US006922986B2

(12) United States Patent
Rozario

(10) Patent No.: US 6,922,986 B2
(45) Date of Patent: Aug. 2, 2005

(54) CATALYTIC CONVERTER EARLY LIGHT OFF USING CYLINDER DEACTIVATION

(75) Inventor: Frederick J. Rozario, Fenton, MI (US)

(73) Assignee: General Motors Corporation, Detroit, MI (US)

( * ) Notice: Subject to any disclaimer, the term of this patent is extended or adjusted under 35 U.S.C. 154(b) by 231 days.

(21) Appl. No.: 10/017,441

(22) Filed: Dec. 14, 2001

(65) Prior Publication Data

US 2003/0110762 A1 Jun. 19, 2003

(51) Int. Cl.$^7$ .................................................. F01N 3/00
(52) U.S. Cl. ........................... 60/284; 60/274; 60/285; 60/300; 123/198 F
(58) Field of Search ..................... 60/284, 285, 300, 60/274; 123/198 F, 481

(56) References Cited

U.S. PATENT DOCUMENTS

| 4,134,261 | A | * | 1/1979 | Iizuka et al. ................... 60/276 |
| 4,230,076 | A | | 10/1980 | Mueller | |
| 4,249,488 | A | | 2/1981 | Siegla | |
| 5,007,390 | A | * | 4/1991 | Tanaka et al. ............... 123/180 |
| 6,023,929 | A | * | 2/2000 | Ma ......................... 123/198 F |
| 6,164,065 | A | * | 12/2000 | Denari et al. .................. 60/284 |
| 6,182,446 | B1 | * | 2/2001 | Gunther et al. ................ 60/278 |
| 6,205,776 | B1 | * | 3/2001 | Otsuka ......................... 60/285 |
| 6,276,138 | B1 | * | 8/2001 | Welch .......................... 60/602 |
| 6,389,806 | B1 | * | 5/2002 | Glugla et al. ................ 123/697 |
| 6,415,601 | B1 | * | 7/2002 | Glugla et al. .................. 60/274 |

FOREIGN PATENT DOCUMENTS

| JP | 55-029002 | * | 3/1980 |
| JP | 55-049549 | * | 4/1980 |

OTHER PUBLICATIONS

7. Aachener Kolloquium Fahrzeug– und Motorentechnik 1998; "Reduzierung Von Kraftstoffverbrauch und Abgase Durch Zylinderabschaltung" (Reduced Fuel Consuption & Emissions Through Cylinder Deactivation); Sandford/Allen/Tudor/Maas/Hass; p. 1–11.
Mercedes–Benz S–Class; "Four Made of Eight—The New 4.31 and 5.01 V8 Engines", Fortnagel/Doll/Kollmann/Weining; p. 58–63.
Road & Track; V–8–6–4 Cadillac tries multi displacement, John Lamm; p. 14.
Road Test; Cadillac Sedan de Ville, "Holding on for dear life with the world's first variable–displacement engine", Apr. 1981; p. 63–70.
WARD'S Engine and Vehicle Technology Update; "New Mercedes revives V–8 cylinder deactivation", Oct. 1, 1998; p. 4.

* cited by examiner

Primary Examiner—Thomas Denion
Assistant Examiner—Diem Tran
(74) Attorney, Agent, or Firm—Christopher DeVries

(57) ABSTRACT

A vehicle includes an engine that has a plurality of cylinders and that generates exhaust gas. A catalytic converter reduces harmful emissions from the exhaust gas after achieving a light off temperature. A controller is connected to the engine and the catalytic converter. The controller deactivates the cylinder(s) of the engine before the catalytic converter achieves the light off temperature if the engine is operating at idle or low load. The controller waits a first period before deactivating the cylinder(s). The controller optimizes engine operating parameters to reduce a second period that is required to achieve the light off temperature. A temperature sensor is connected to the controller and senses ambient temperature. The controller does not deactivate the cylinders if the ambient temperature is below a first predetermined temperature. The controller activates all of the cylinders if the engine is operating at high load.

18 Claims, 2 Drawing Sheets

CATALYTIC CONVERTER EARLY LIGHT OFF USING CYLINDER DEACTIVATION

TECHNICAL FIELD

The present invention relates to engine control systems, and more particularly to engine control systems that deactivate one or more cylinders to promote the transition from rich to stoichiometric air-fuel ratios during startup and early light off of a catalytic converter.

BACKGROUND OF THE INVENTION

In order to reduce emissions, modern car engines carefully control the amount of fuel that is burned. The engines control the air-fuel ratio to achieve an optimum stoichiometric ratio. At the optimum stoichiometric ratio, all of the fuel is burned using all of the oxygen in the air. For gasoline, the stoichiometric ratio is about 14.7:1. In other words, for each pound of gasoline, 14.7 pounds of air is burned. The air-fuel ratio varies from the optimum stoichiometric ratio during driving. Sometimes the air-fuel ratio is lean (an air-to-fuel ratio higher than 14.7) and other times the air-fuel ratio is rich (an air-to-fuel ratio lower than 14.7).

The primary emissions of a car engine are nitrogen, carbon dioxide and water vapor. Air is approximately 78 percent nitrogen ($N_2$) gas. Most of the nitrogen passes through the car engine. Carbon dioxide ($CO_2$) is produced when carbon in the fuel bonds with the oxygen in the air. Water vapor ($H_2O$) is produced when hydrogen in the fuel bonds with the oxygen in the air.

Because the combustion process is never perfect, some additional harmful emissions are also produced by car engines. Carbon monoxide (CO), a poisonous gas that is colorless and odorless, is produced. Hydrocarbons or volatile organic compounds (VOCs), resulting from unburned fuel that evaporates, are produced. Sunlight breaks these emission down to form oxidants that react with oxides of nitrogen to cause ground level ozone ($O_3$), a major component of smog. Oxides of nitrogen (NO and $NO_2$, together called NOx) contribute to smog and acid rain and cause irritation to human mucus membranes. Catalytic converters are designed to reduce these three harmful emissions.

Most modern cars are equipped with three-way catalytic converters. "Three-way" refers to the three harmful emissions that catalytic converters help to reduce—carbon monoxide, VOCs and NOx. The catalytic converter uses two different types of catalysts, a reduction catalyst and an oxidization catalyst. Both types include a ceramic structure that is coated with a metal catalyst, usually platinum, rhodium and/or palladium. The catalytic converter exposes the catalyst to the exhaust stream while minimizing the amount of catalyst that is required due to the high cost of the catalyst materials.

There are two main types of structures that are used in catalytic converters—honeycomb and ceramic beads. Most cars today use a honeycomb structure. The reduction catalyst is the first stage of the catalytic converter that typically uses platinum and rhodium to help reduce the NOx emissions. When the NOx molecules contact the catalyst, the catalyst separates the nitrogen from the molecule, holds on to the nitrogen and frees the oxygen in the form of $O_2$. The nitrogen bond with other nitrogen that are also held by the catalyst, forming $N_2$. For example:

$$2NO => N_2+O_2 \text{ or } 2NO_2 => N_2+2O_2$$

The oxidation catalyst is the second stage of the catalytic converter that reduces the unburned hydrocarbons and carbon monoxide by burning (oxidizing) them over a platinum and palladium catalyst. The oxidation catalyst reacts the CO and hydrocarbons with the remaining oxygen in the exhaust gas. For example:

$$2CO+O_2 => 2CO_2$$

The third stage is a control system that monitors the exhaust stream and uses the information to control the fuel injection system. Typically an oxygen sensor is mounted between the engine and the catalytic converter. The oxygen sensor senses oxygen in the exhaust. An engine control system increases or decreases the amount of oxygen in the exhaust by adjusting the air-fuel ratio. The engine control system makes sure that the engine is running at close to the optimum stoichiometric ratio and that there is enough oxygen in the exhaust to allow the oxidization catalyst to burn the unburned hydrocarbons and CO.

While the catalytic converter reduces pollution, the catalytic converter can still be improved substantially. The catalytic converter only works at a fairly high temperature. When a car is started, the catalytic converter does not reduce the pollution in the exhaust until the catalytic converter reaches a predetermined temperature that is also called the light off temperature.

One conventional solution to the problem is to move the catalytic converter closer to the engine. The hot exhaust gases reach the catalytic converter more quickly and heats it up faster. This approach tends to reduce the life of the catalytic converter by exposing it to extremely high temperatures. Most carmakers position the catalytic converter under the front passenger seat, far enough from the engine to keep the temperature down to levels that will not harm it.

Preheating the catalytic converter is another conventional way to reduce emissions. The easiest way to preheat the converter is to use electric resistance heaters. Unfortunately, the 12-volt electrical systems on most cars do not provide enough energy to heat the catalytic converter fast enough. Most drivers will not wait several minutes for the catalytic converter to heat up before starting their car.

SUMMARY OF THE INVENTION

A vehicle control system according to the invention controls an engine that includes a plurality of cylinders and that generates exhaust gas. A catalytic converter reduces harmful emissions from the exhaust gas after reaching a light off temperature. A controller is connected to the engine and the catalytic converter. The controller deactivates at least one of the cylinders of the engine before the catalytic converter achieves the light off temperature.

In other features of the invention, the controller waits a first period before deactivating the cylinder(s). The controller optimizes engine operating parameters while the cylinder (s) are deactivated to reduce a second period that is required to achieve the light off temperature.

In yet other features, a temperature sensor is connected to the controller and senses ambient temperature. The controller does not deactivate the cylinder(s) if the ambient temperature is below a first predetermined temperature.

In still other features, the controller only deactivates the cylinder(s) if the engine is operating at idle or low load. The controller does not deactivate the cylinder(s) if the engine is operating at high load.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION OF THE PREFERRED EMBODIMENT

The following description of the preferred embodiment(s) is merely exemplary in nature and is in no way intended to limit the invention, its application, or uses.

Figure 1:
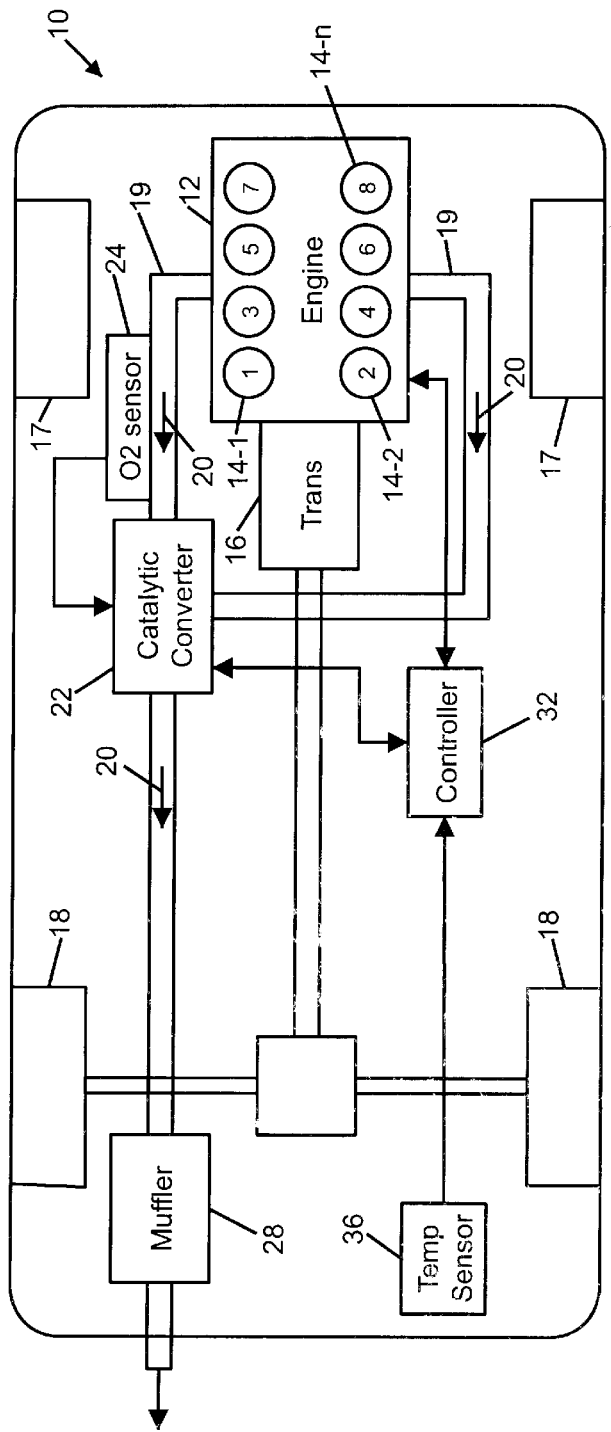
FIG. 1 is a functional block diagram illustrating a vehicle with an engine, a catalytic converter and a controller that deactivates one or more cylinders of the engine to promote early light off of the catalytic converter.

Referring now to FIG. 1, a vehicle 10 includes an engine 12 with a plurality of cylinders 14-1, 14-2, . . . , 14-n. The engine 12 is connected to a transmission 16 that drives front wheels 17 and/or rear wheels 18 of the vehicle 10. The engine 12 is also connected to an exhaust manifold 19. The exhaust manifold 19 directs exhaust gas 20 from the engine 12 to a catalytic converter 22. An oxygen sensor 24 is typically located between the engine 12 and the catalytic converter 22. As can be appreciated, the oxygen sensor 24 can be located in other positions and/or omitted. A muffler 28 is also located downstream from the catalytic converter 22.

A controller 32 is connected to the catalytic converter 22, the engine 12, and to one or more engine operating sensors and/or environmental sensors, such as an ambient temperature sensor 36. As will be described more fully below, the controller 32 deactivates one or more of the cylinders 14 of the engine 12 during idle or low load conditions as soon as possible after the engine 12 starts up. Cylinder deactivation methods are disclosed in U.S. Pat. No. 4,249,488 to Siegla and U.S. Pat. No. 4,230,076 to Mueller, which are hereby incorporated by reference. Other methods are disclosed in "Cadillac Sedan DeVille, Hold on for dear life with the world's first variable-displacement engine", Car and Driver (April 1981); "New Mercedes revives V-8 cylinder deactivation", Peter Robinson, Ward's Engine and Vehicle Technology Update (Oct. 1, 1998); and "Reduced Fuel Consumption and Emissions Through Cylinder Deactivation", Malcolm H. Sanford et al (Oct. 7, 1998), which are hereby incorporated by reference. The working cylinders 14 are at a higher load with faster flame heads and more stable combustion (as compared to when all cylinders are operating). The controller 32 quickly transitions from rich to stoichiometric air fuel mixtures while simultaneously allowing spark angle retard for increased exhaust gas temperatures and quicker light off of the catalytic converter 22. The idle speed of the engine 12 is also optimized as necessary during the warmup period of the catalytic converter 22.

Once light off of the catalytic converter 22 is achieved, the engine 12 is switched back to default operation, which may or may not include operation using all of the cylinders 14 depending upon other factors. At very cold temperatures (such as −40° C. to 20° C.), full operation of the engine 12 (e.g., all cylinders) is performed.

Cylinder deactivation involves turning off one or more of the cylinders of the engine 12 during idle and light load operating conditions. Full engine operation is automatically restored when necessary for acceleration or for hauling heavy loads. During idle and light load operating conditions, the (fewer) working cylinders operate at higher load. During idle and light load operating conditions, the engine 12 has higher combustion stability and fuel efficiency due to better thermal, volumetric, and mechanical efficiency.

Figure 2:
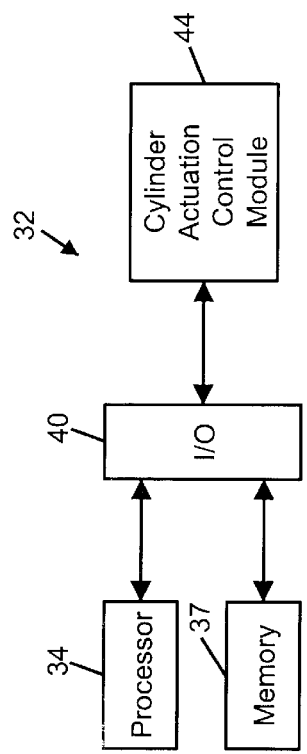
FIG. 2 is a functional block diagram of the controller of FIG. 1.

Referring now to FIG. 2, the controller 32 is illustrated in further detail. The controller 32 includes a processor 34, memory 37, and an input/output interface 40. A cylinder actuation control module 44 controls activation and deactivation of the cylinders 14 of the engine 12. The cylinder actuation control module 44 can be implemented as a software module or as a dedicated circuit. The memory 37 includes read-only memory (ROM), random access memory (RAM), flash memory, or other suitable electronic storage. The controller 32 can also be implemented as an application specific integrated circuit (ASIC).

Figure 3:
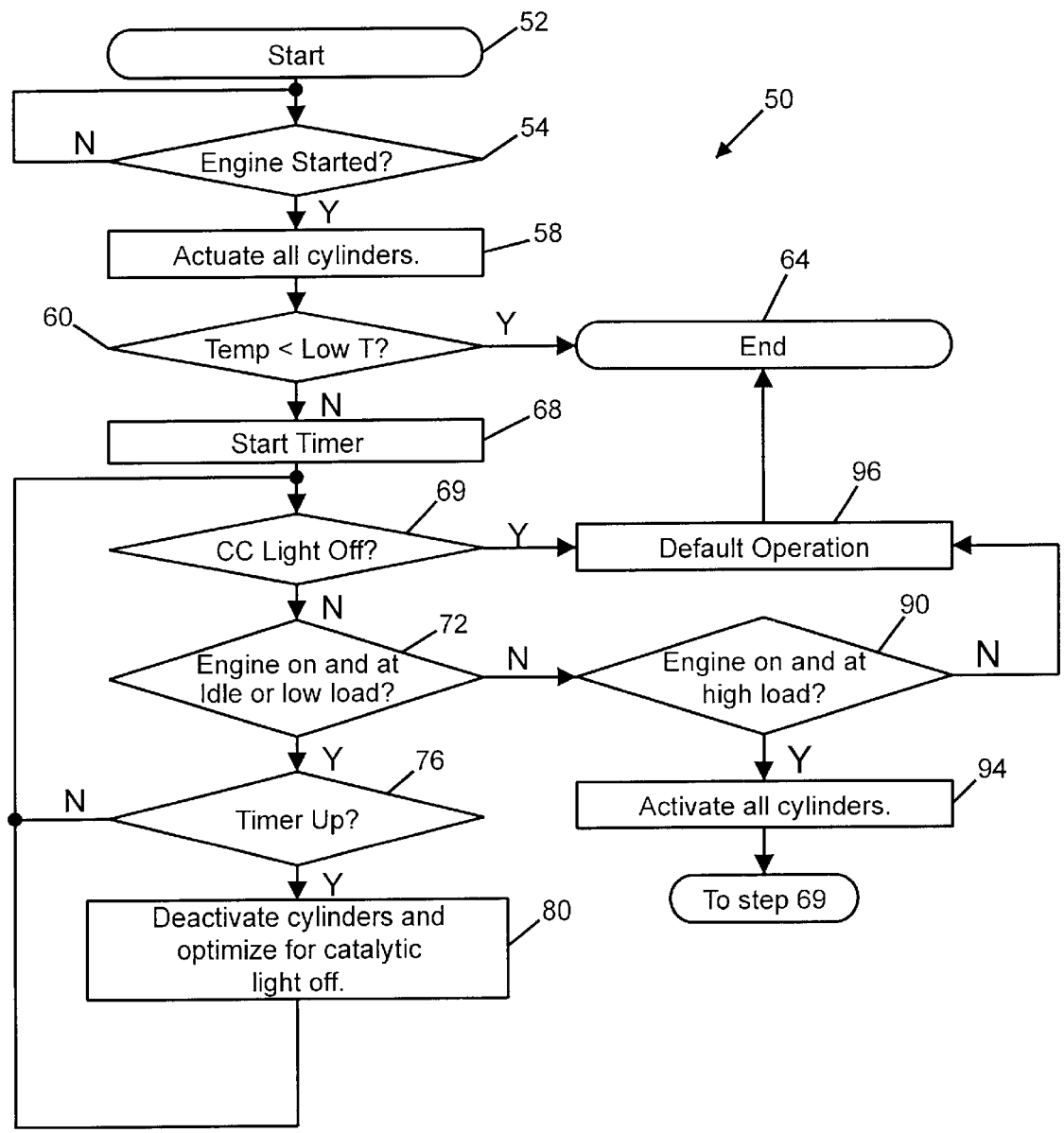
FIG. 3 is a flowchart illustrating steps performed by the controller of FIGS. 1 and 2.

Referring now to FIG. 3, steps performed by the controller 32 and the cylinder actuation control module 44 are shown in further detail and are generally designated 50. Control begins with step 52. In step 54, the controller 32 determines whether the engine 12 is started. If not, control loops back to step 54. Otherwise, the controller 32 continues with step 58 where all of the cylinders 14 are initially actuated. In step 60, the controller 32 determines whether the temperature is less than a predetermined temperature such as 20° C. If it is, the cylinder actuation control module 44 ends in step 64. If not, the controller 32 continues with step 68 and starts a timer. In step 69, the controller 32 determines whether the catalytic converter 22 is at the light off temperature. If the catalytic converter 22 is not at the light off temperature, control continues with step 72.

In step 72, the controller 32 determines whether the engine 12 is on and is operating at idle or low load. If it is, the controller 32 continues with step 76 and determines whether the timer is up. Typically, the timer is preferably set for a first period that is equal to five to ten seconds after the engine 12 starts up. If the timer is not up, control continues with step 69. Otherwise, control continues with step 80 where one or more of the cylinders 14 are deactivated and the engine 12 is optimized for light off of the catalytic converter 22. Control continues from step 80 to step 69.

If the conditions of step 72 are not met, control continues with step 90 where the controller 32 determines whether the engine 12 is on and at high load. If it is, the controller 32 continues with step 94 where all of the cylinders 14 are actuated. Control continues from step 94 to step 69. When the catalytic converter 22 reaches its light off temperature as determined in step 69, the controller 32 continues with step 96 where default operation of the engine 12 is performed, which may include activation of some or all of the cylinders 14.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A vehicle control system comprising:

an engine that includes a plurality of cylinders and that generates exhaust gas;

a catalytic converter that reduces harmful emissions from said exhaust gas after said catalytic converter reaches a light off temperature;

a controller that is connected to said engine and said catalytic converter and that deactivates at least one of said cylinders of said engine before said catalytic converter achieves said light off temperature to hasten light off of said catalytic converter; and a temperature sensor that is connected to said controller, and wherein said temperature sensor senses ambient temperature; and wherein said controller does not deactivate said at least one of said cylinders is said ambient temperature is below a first predetermined temperature.

2. The vehicle control system of claim 1 wherein said controller optimizes engine operating parameters to hasten light off of said catalytic converter.

3. The vehicle control system of claim 1 wherein said controller waits a first predetermined period after engine startup before deactivating said at least one of said cylinders.

4. The vehicle control system of claim 3 wherein said first predetermined period is between 4 and 11 seconds.

5. The vehicle control system of claim 1 wherein said controller deactivates said at least one of said cylinders if said engine is operating at one of idle and low load.

6. The vehicle control system of claim 1 wherein said controller activates all of said cylinders if said engine is operating at high load.

7. A vehicle control system comprising:

an engine that includes a plurality of cylinders and that generates exhaust gas;

a catalytic converter that reduces harmful emissions from said exhaust gas after said catalytic converter reaches a light off temperature;

a controller that is connected to said engine and said catalytic converter and that deactivates at least one of said cylinders of said engine before said catalytic converter achieves said light off temperature to hasten light off of said catalytic converter;

wherein said controller deactivates said at least one of said cylinders if said engine is operating at one of idle and low load and wherein said controller activates all of said cylinders if said engine is operating at high load; and wherein said controller does not deactivate said at least one of said cylinders if said ambient temperature is below a first predetermined temperature.

8. The vehicle control system of claim 7 wherein said controller optimizes engine operating parameters while said at least one of said cylinders is deactivated to hasten light off of said catalytic converter.

9. The vehicle control system of claim 7 wherein said controller waits a first predetermined period after engine startup before deactivating said at least one of said cylinders.

10. The vehicle control system of claim 9 wherein said first predetermined period is between 5 and 10 seconds.

11. A method for controlling an engine comprising:

providing an engine that includes a plurality of cylinders and that generates exhaust gas;

reducing emissions from said exhaust gas using a catalytic converter;

connecting a controller to said engine and said catalytic converter; and deactivating at least one of said cylinders of said engine before said catalytic converter achieves a light off temperature; and sensing ambient temperature.

12. The method of claim 11 further comprising optimizing engine operating parameters to hasten light off of said catalytic converter.

13. The method of claim 11 further comprising activating all of said cylinders if said ambient temperature is below a first predetermined temperature.

14. The method of claim 11 further comprising waiting a first predetermined period before said deactivating step.

15. The method of claim 14 wherein said first period is between 5 and 10 seconds.

16. The method of claim 11 wherein said controller deactivates said at least one of said cylinders only if said engine is operating at one of idle and low load.

17. The method of claim 11 wherein said controller does not deactivate said at least one of said cylinders if said engine is operating at high load.

18. The method of claim 11 further comprising adjusting an air-fuel mixture after said deactivating step to create a more lean air-fuel mixture.

* * * * *